Oct. 4, 1927.
G. A. BRODIE
1,644,413
COW MILKING APPARATUS
Filed Jan. 6, 1925
8 Sheets-Sheet 3
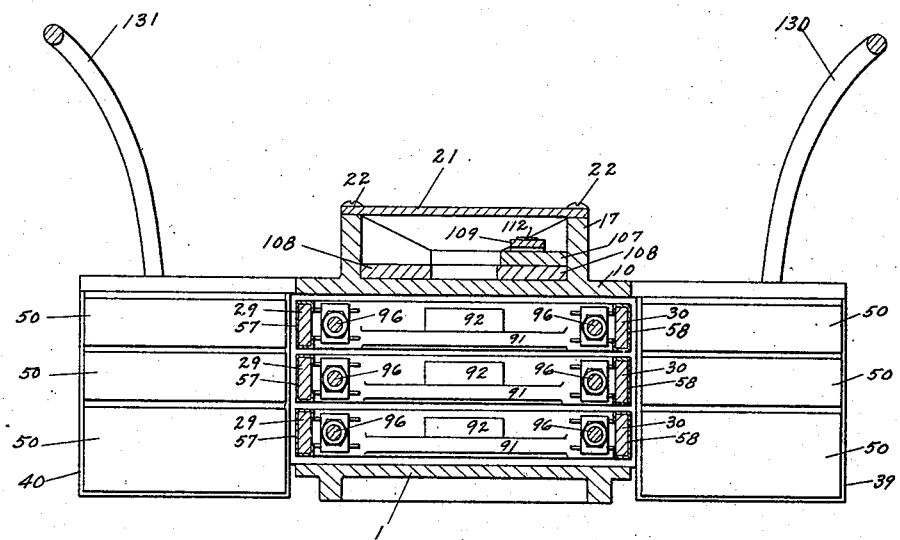
Fig. IV
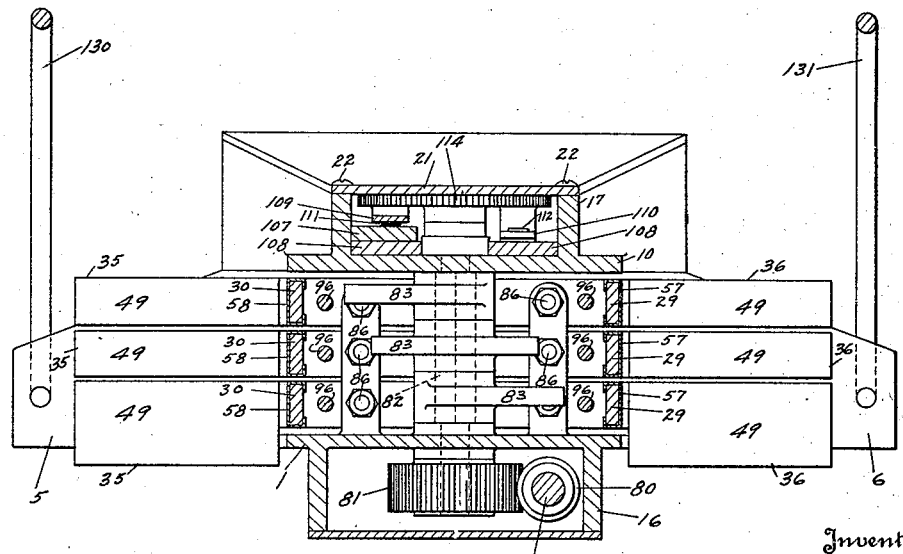
Fig. V
Inventor:
George A. Brodie
By Atkins & Atkins,
Attorneys.

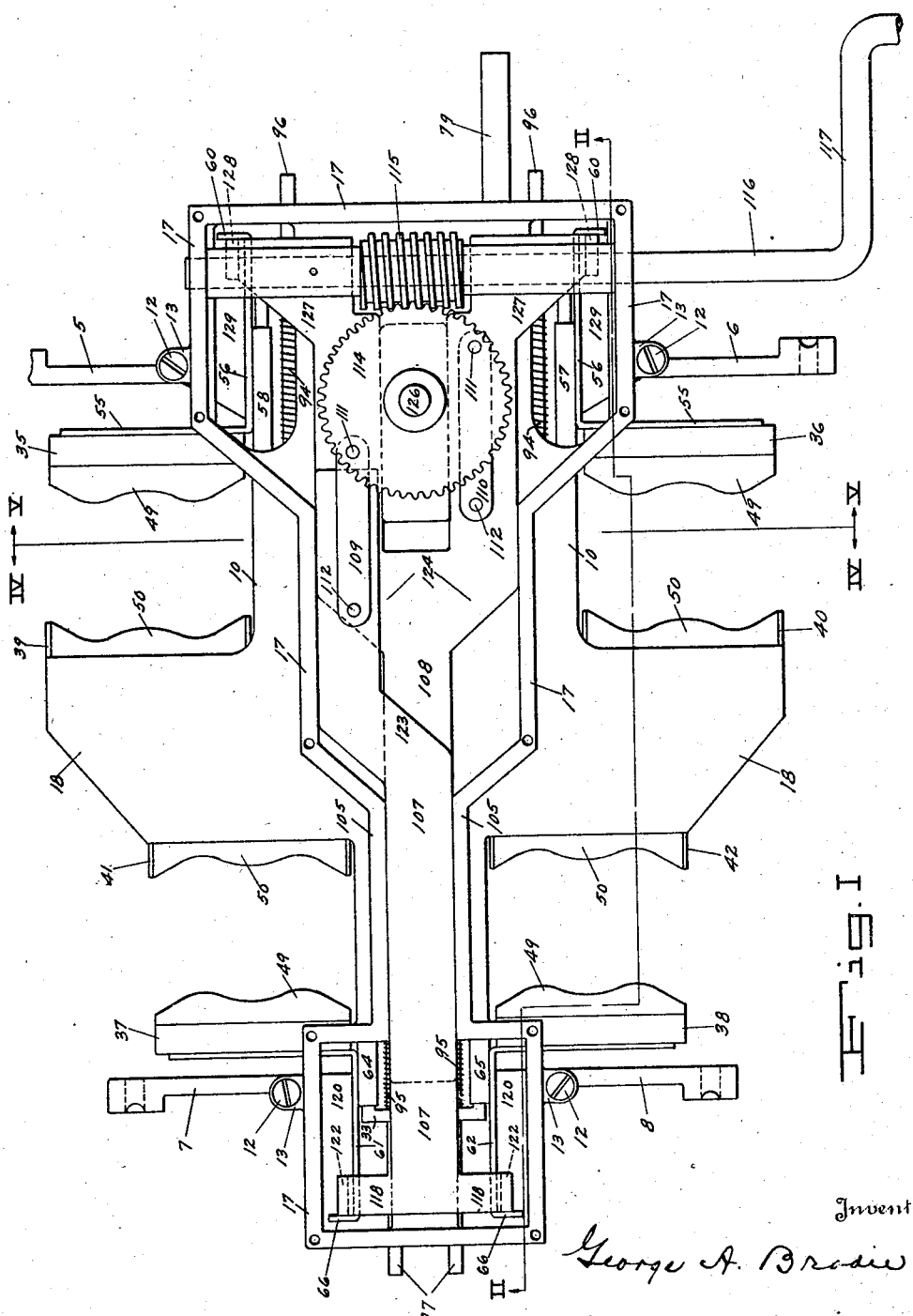

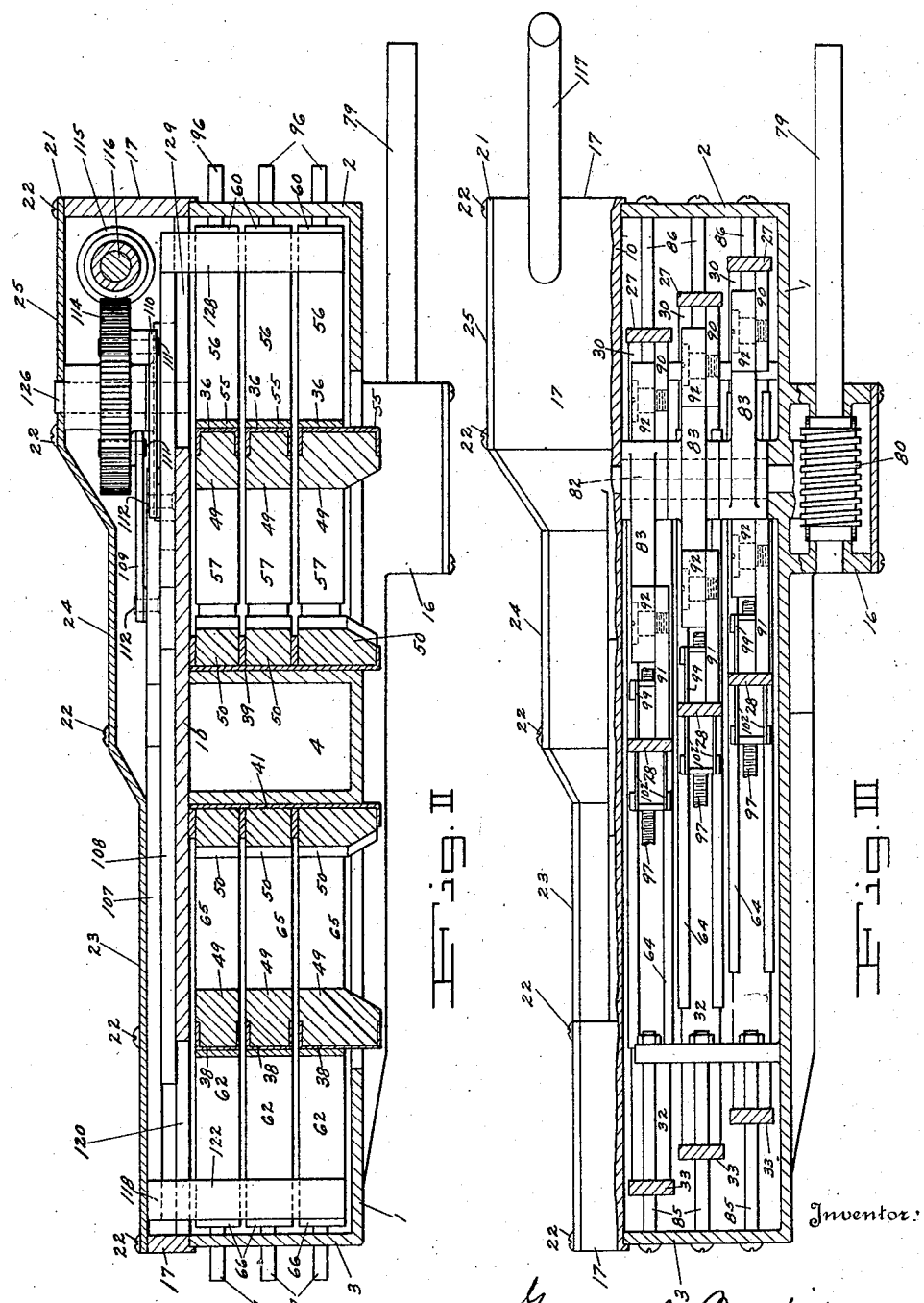

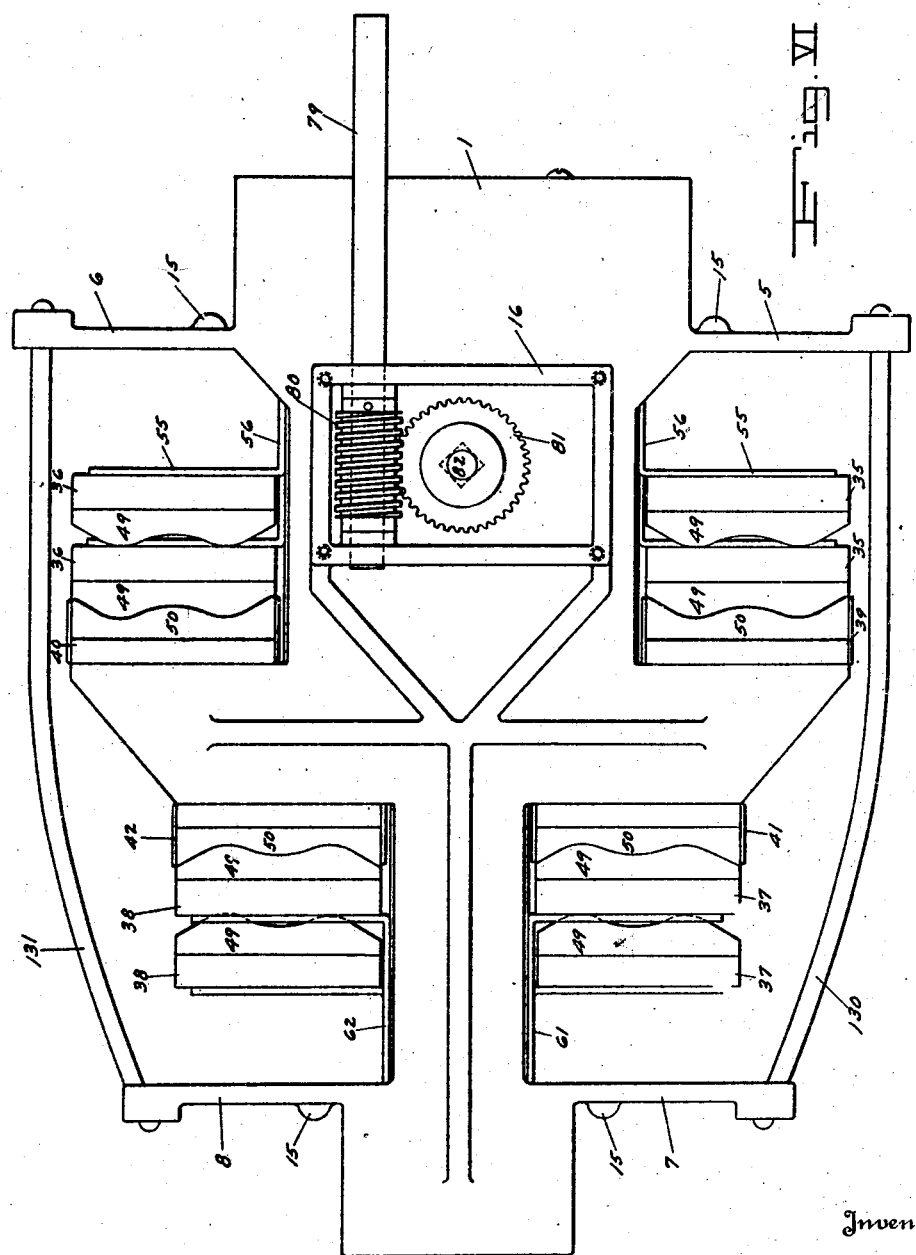

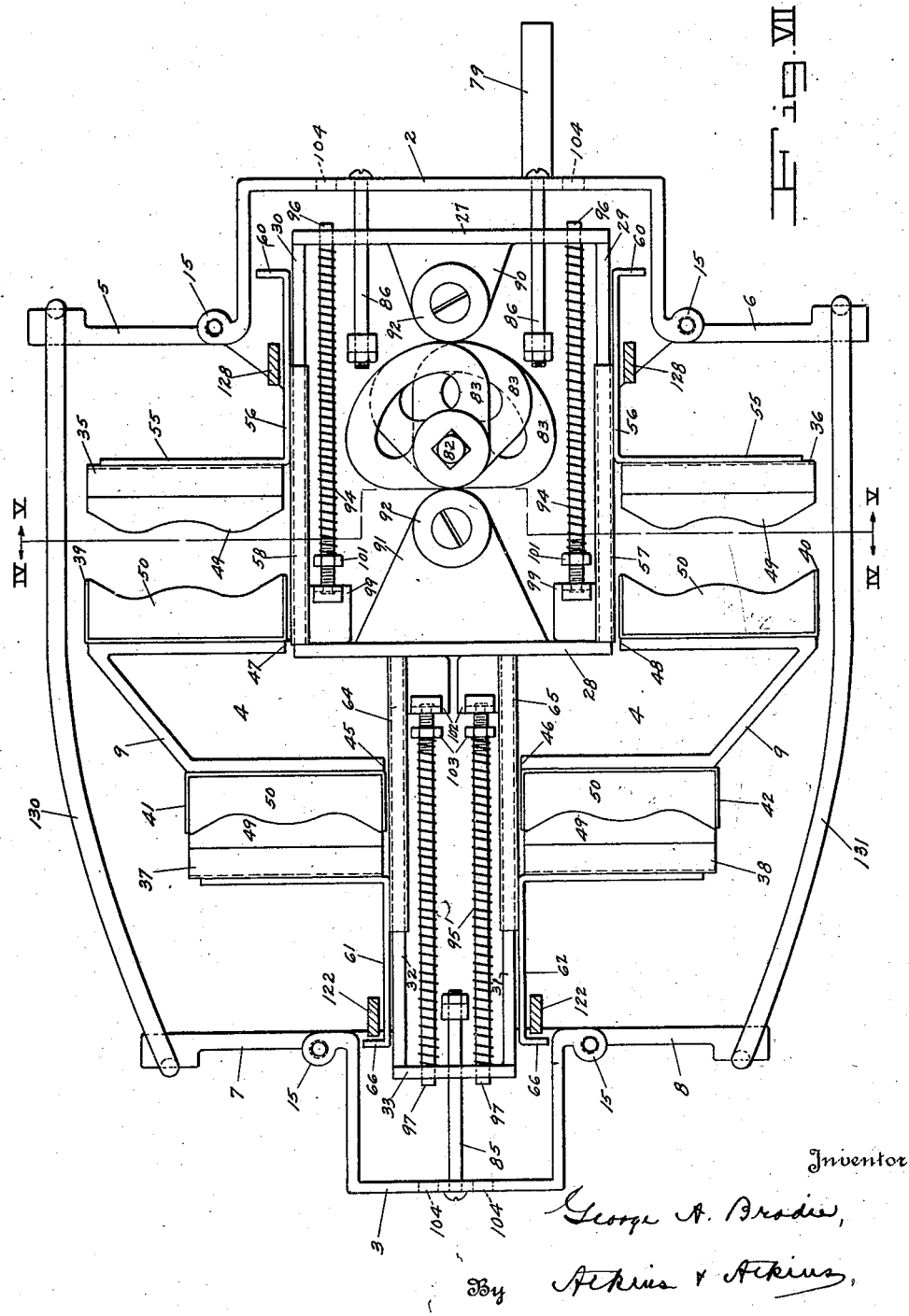

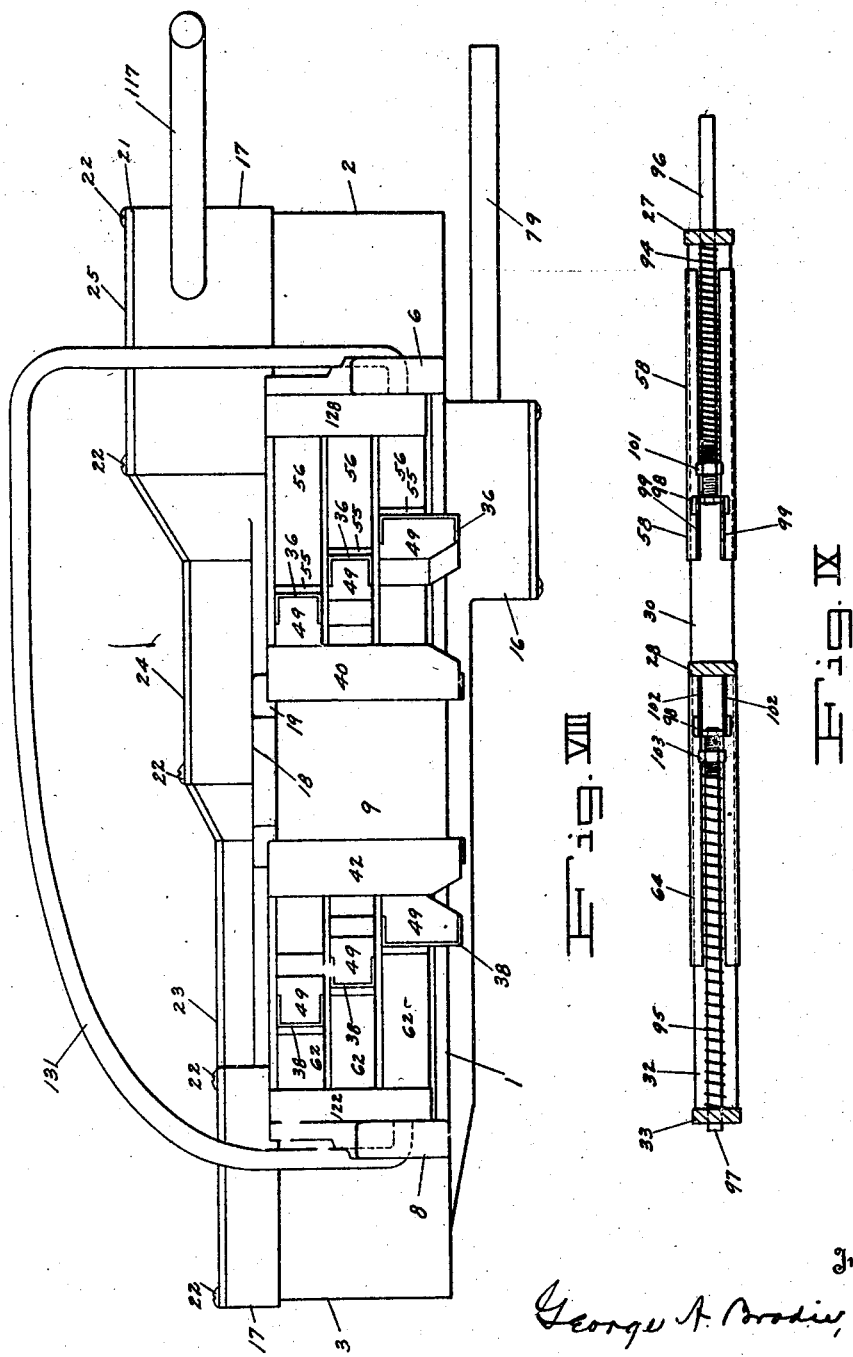

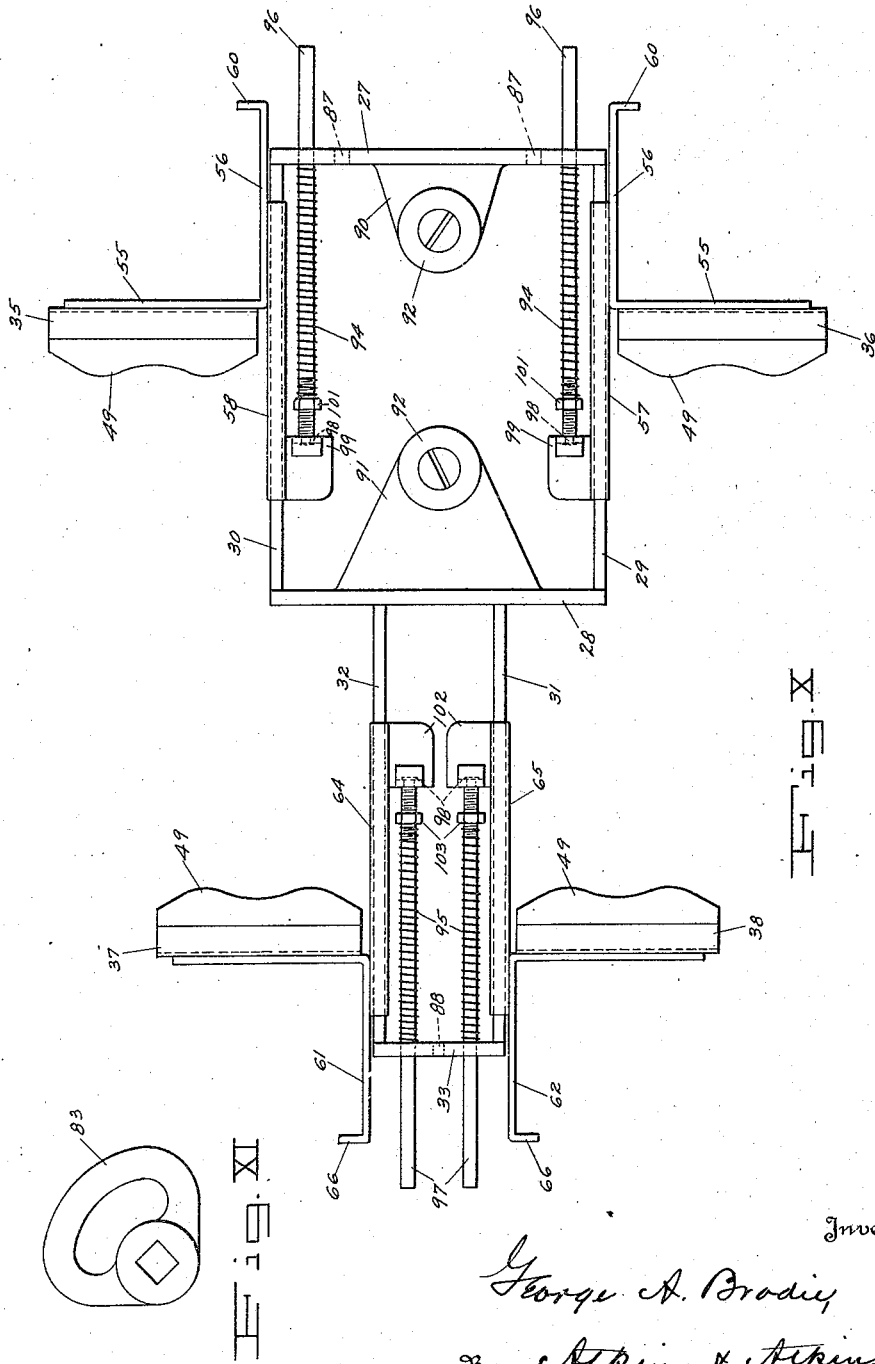

Oct. 4, 1927.
G. A. BRODIE
1,644,413
COW MILKING APPARATUS
Filed Jan. 6, 1925
8 Sheets-Sheet 8
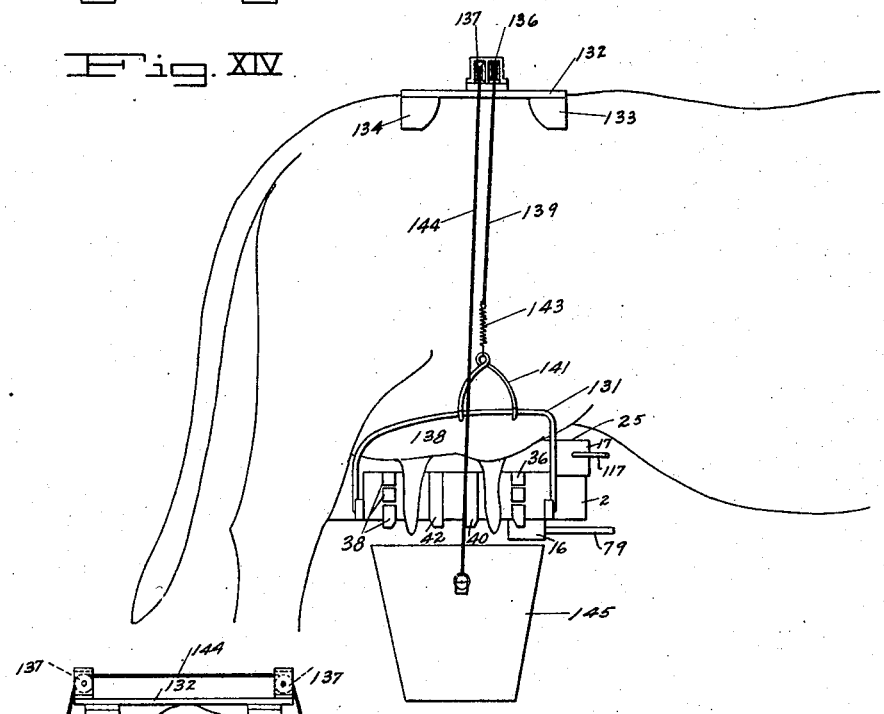

Patented Oct. 4, 1927.

1,644,413

UNITED STATES PATENT OFFICE.

GEORGE A. BRODIE, OF GOLDENDALE, WASHINGTON.

COW-MILKING APPARATUS.

Application filed January 6, 1925. Serial No. 849.

My invention relates to cow milking apparatus, and, in its broadest aspect, is designed and intended to produce and does produce by mechanical means a substantial reproduction of the means and method employed in milking a cow by hand, with the addition of means for accomplishing even better results than can be effected manually by even the most skillful manipulator.

A very important object of the present invention resides in the provision of a milking apparatus having teat chambers and teat compressing members so arranged and constructed that they permit the teats to hang free in natural positions during the entire milking operation, in spite of the shrinkage of the udder and consequent movement of the teats due to the extraction of milk therefrom.

One object successfully attained by my invention is the drawing of milk from a cow by the direct application to the cow's teats of mechanical means for effectually compressing each teat, as distinguished from that class of milking appliances which operate by suction.

My machine is, moreover, adapted to be attached to the body of a cow, and to be operated by any mode of application of power so as to effect the milking operation by the squeezing of the cow's teats between suitable cooperative compressing members corresponding, in effect, to the fingers of the human hand. Also, the action of said members, being gentle, efficient and positive, is accomplished without being in any wise injurious to the cow, no matter how long the operation may be continued, even after the teat is emptied of its milk content.

I have embodied my invention in a machine that may be cheaply manufactured, which is simple and durable in construction and inexpensive to operate, and which, being comparatively light in weight, may be easily and readily transported from place to place so as to be quickly attached to a cow for milking purposes when desired, and to be quickly and easily removed therefrom when the milking operation is performed.

Another object attained by my invention is to produce a machine which is in use clean and sanitary, mainly because its principle of operation permits the milk to pass directly from the teats of the cow into a pail or other receptacle suspensible, for example, below the milking apparatus, without any necessity for its coming in contact with the hands of the operator or other object, and which also functionates as a shield between the cow and the pail to protect the milk in the pail from the falling of particles of dirt into it.

Ordinarily the wiping of the machine after each milking is sufficient to keep it in clean condition, but the construction of the machine facilitates the taking of it apart, and the scalding if need be, of all its parts, each of which is made of open work construction that is easily accessible to any cleansing manipulation desired.

Another result of greatest importance made possible by my invention is the production of a machine which will milk a cow entirely dry. It is a well known physical fact that if a cow is not milked thoroughly clean at each milking, the natural flow of her milk will gradually diminish and will in short time cease entirely. This is one essential in which all mechanical milkers hitherto have been found wanting. It has been found comparatively easy to get a machine which will, at the beginning of its operation, milk with more or less success, but which fails in the end, because after the milk content of the udder is partly drawn out, the little capillaries, milk veins, and spongy cells of which the udder is by nature composed, hold up a residue of the milk, and will not let it all descend into the teats. For that reason no machine that has been hitherto devised will thoroughly, harmlessly, and completely milk a cow. Even in the use of so-called successful suction milkers, watchful care must be exercised to prevent injurious application of excessive suction, and expensive hand stripping becomes a practical essential to completion of the milking operation. In this distinctive particular, my machine is entirely successful, not only because it strips each teat of all milk received by it from the udder, but also because, by provision in its operation of means for imparting to the udder a constant gentle agitation which is even more effective than the "nudging" of the udder which a calf gives, it induces the udder to discharge into the teats its entire milk content which is afterwards, without manipulation, drawn off entirely by the machine.

Another characteristic feature of my invention is that is enables the operation of milking to be, at a considerable saving of time, performed by sets of cooperative compressing members having each a comparatively small stroke, while, for the purpose of putting the apparatus in place upon a cow or for removing it when the milking is done, means are employed for providing in each instance named a comparatively large space for the reception of the cow's teats between each pair of said members as is hereinafter specified.

It should be further observed that my machines, by reason of their constructive and functional novel features, as above enumerated for example, may be employed in groups, each group comprehending a large number of units, and all operable, for example, from a line shaft or other single source of power. By reason thereof, each of such groups may be placed under the supervision of a single attendant without danger of any injurious results, either to the animals or to the mechanism, whereby a large economy in operation may be effected.

With the foregoing and other obviously new and useful objects in view, what constitutes my invention will be hereinafter described in detail and succinctly defined in the appended claims.

In the accompanying drawings, in which is shown my invention complete in present preferred form of embodiment, Figure I is a top plan view of my machine, with the cover plate of the frame cap removed to show the interior working parts, and showing said parts in the relative positions they assume when the compressing members or fingers are approximately fully opened preparatory either to the application of the machine to a cow for milking, or to its removal after the milking operation.

Figure II is a longitudinal vertical section partly in elevation taken on the line II—II looking in the direction of the arrows, and showing in place the cover plate which is omitted from Figure I.

Figure III is a view similar to Figure II, but taken substantially on the longitudinal medial line of Figure I.

Figure IV is a transverse vertical section on the line IV—IV of Figure I and of Figure VII, respectively, that is, looking to the left from the section line indicated.

Figure V is a view similar to Figure IV, but looking to the right from said section line.

Figure VI is a bottom plan view of my machine complete, showing the driving gear thereof exposed by removal of the lid of the case in which it works, the four sets of fingers being shown in their successive relative positions as in practical operation of the machine.

Figure VII is a top plan view of the machine with the cap plate and parts carried thereby removed, showing the finger-actuating mechanism in place in the frame, and also showing the two sets of fingers to the left in their completely closed positions, and the other two sets of fingers in correspondingly open positions.

Figure VIII is a side elevation of my complete machine as illustrated in Figure VII, showing the relative positions in successive vertical order of operation of the two sets of compressing members or fingers which are visible from one side of the machine.

Figure IX is a longitudinal section partly in elevation, showing the yielding driving-supports for two complementary sets of the compressiong members or fingers.

Figure X is a top plan view of one of the finger-supporting frames detached, and showing the fingers thereof at the extreme limit of their separation as approximately illustrated in Figure I.

Figure XI is a top plan view of one of the finger-actuating cams, detached.

Figure XII is a side elevation of the rear end of the body of a cow showing diagrammatically the means of suspending my machine therefrom and the mode of its application to the cow.

Figure XIII is a rear view or one taken at right angles to that shown in the previous figure, the conformation of part of the body of the cow being, only so far as need be, indicated in mere outline.

Fig. XIV is a top plan of the saddle for supporting the device upon a cow.

Referring to the numerals on the drawings, 1 indicates the bottom plate of a supporting or assembling frame which carries all the working parts of the machine in appropriate working relationship. It is provided preferably with end walls 2 and 3, an intermediate transverse vertical partition or compartment 4, and transverse wing walls 5, 6, 7, and 8, each parallel to the opposite side walls which with two oblique end walls 9 define the compartment 4. A cap plate 10 which corresponds substantially in plan contour to the bottom plate 1, is detachably secured to the plate 1 upon top of the side walls thereof, as by screws 12 inserted through ears 13, and threaded into lugs 15, as shown by comparison of Figures I and VII.

The external face of the bottom plate 1 may be substantially flush over all except for the outward projection therefrom of a gear box 16. The cap plate 10 preferably comprises a continuous side wall 17 which extends all around it and makes a snug slip fit with the walls upstanding from the plate 1, wings 18 having flanges 19, being provided on the plate 10 as coverings for the laterally extended ends of the compartment 4. The side wall 17 is surmounted by a cover plate 21 conformable to it in shape, and detachably united to it as by tap screws 22. The vertical contour of the side wall 17 is at different points varied in elevation so as to divide the cover plate 21 into three severally distinct parallel planes 23, 24, and 25, as is well shown in Figure VIII, for example.

Provision of different planes in the cover plate 21 is made not only for convenient accommodation of the internal mechanism of the machine, but also to be conformable to the shape of the lower face of a cow's udder, whereby the machine, when it is in substantially horizontal or milking position, may be made to hug the bottom of the udder closely at all points of contact.

It may be noted that the length of the end wall 3, which is less than that of the end wall 2, is determinable by the width of the space between a cow's hind legs between which the said narrower end 3 of the machine is inserted from in front. The wall 3 may be therefore designated the rear end wall.

The height of the wall 2 is equal to that of the wall 3, and is substantially that of a partial enclosure, defined in part by said walls upon the bottom plate 1, for the reception and operative accommodation of a vertical series of finger-supporting frames of which one is shown in Figure X, for example, complete and detached from the frame of which the bottom plate 1 and walls 2 and 3 are portions.

The number of said finger-supporting frames employed in series as just specified is not necessarily fixed, but may be, if desired, varied to suit the length of cow's teat the series is intended to accommodate. The finger-supporting frames illustrated in the drawings are three in number, and that number is deemed ordinarily sufficient to constitute a complete series.

Referring, for example, to Figure X, each of said finger-supporting frames preferably consists of two rigid, oblong, rectangular subordinate frames, one wider than the other, united to form one main frame. The wider of said two subordinate frames is made up of two opposite end rails 27 and 28, and two side rails 29 and 30.

The narrower of said two subordinate frames is made up likewise of four rails, namely two side rails 31 and 32 that are parallel to the rails 29 and 30, and two end rails 33 and 28 aforesaid, the rail 28 being common to the two subordinate frames and constituting a single member by which the two subordinate frames aforesaid, are united into one main frame as specified.

Each unitary frame just described, as shown in Figure X, is provided for the operative support of four movable compressing members or fingers numbered 35, 36, 37, and 38, respectively, designed and adapted to coact with stationary compressing members or fingers 39, 40, 41, and 42, shown, for example, in Figures I and VII, as fixed to each of the outer faces of the side walls of the intermediate compartment 4.

Said compartment 4 is provided for operative accommodation of that longitudinal reciprocatory movement of the unitary frame which is, in the operation of the machine, imparted to it. To that end, one of the side walls of said compartment is provided with a gateway defined by opposite edges 45 and 46 for the reception between them of the side rails 31 and 32, of one subordinate frame, and provided also with a gateway defined by opposite edges 47 and 48 for reception between them of the side rails 29 and 30 of the other subordinate frame. It will be convenient to note that the paired edges 45 and 46, and 47 and 48, respectively, are of a height sufficient to accommodate between them as many of the finger-supporting frames as go to make up the full series of the same.

The compressing members above enumerated are designated fingers because each pair thereof cooperates after the manner of a finger and thumb or palm of the hand in the operation of milking by hand. Also, likewise, each finger has a face pad, those on the movable fingers being designated by the numerals 49, and those on the stationary fingers being designated by the numeral 50. I differentiate the pads by number because I prefer to make the face contours of the pads 49 of undulating form having two convex projections and an intermediate concavity, and the faces of the pads 50 of complementary reverse contour, that is to say, of two concavities and one intermediate convex projection. I prefer to employ the form of contour illustrated for the face pads of the fingers because I deem it best adapted for effective teat compression, but the form may be varied if desired, even to the extent of making the face of each pad of each pair of pads flat or in one plane.

The finger pads may be made of any suitable soft yielding material, preferably india rubber, embedded, for instance, or fastened to ordinary metallic boxes or plates adapted to hold them.

Each of the movable fingers is cushioned to the supporting frame on which it is mounted and to which it is, in effect, slidably secured. To that end I prefer to secure the fingers 35 and 36, respectively, to the arm 55 of angle strips whose other arm 56 is securely fastened to one of two runners or clip sleeves 57 and 58 which are slidable lengthwise each upon its respective side rail 29 or 30, and which constitute driving supports for the fingers that they carry.

The said angle strips are substantially identical in form and function, the arm 56 of each terminating in a foot piece 60 projected as by bending the metal of the strip into parallel relationship to the arm 55.

In like manner the fingers 37 and 38 are movably secured to the side rails 32 and 31, respectively, the angle strips therefor, inasmuch as they are substantially identical with those already described, being indicated as a whole by numerals 61 and 62, and the runners or clip sleeves to which they are affixed being indicated by numerals 64 and 65, respectively. The foot pieces of the angle strips 61 and 62 are indicated, respectively, by a numeral 66.

The vertical thickness of each finger and the distance of their separation one from another in series may be varied in the exercise of sound discretion, but both thickness and distance of separation preferably correspond substantially to the average size and disposition of fingers on the human hand.

The milking fingers 49 and 50 are elongated to provide between them elongated teat chambers or spaces in order to allow for the shrinkage of the udder and teats with consequent inward movement of the latter so that they hang perfectly free and in their natural positions at all times, since upon shrinkage the teats move inwardly along the elongated faces of the milking fingers without obstruction. It will be obvious that the milking fingers 49 and 50 and the chambers provided between them are arranged to extend transversely of the cow when the apparatus is associated therewith. It will also be particularly noted that the outer ends of the teat chambers are open and unrestricted for the free inward placement of the teats when the apparatus is first associated with the animal. This arrangement provides for easy insertion of the teats in the chambers and especially more so than in devices wherein it is necessary to place the teats downward into pockets which do not automatically permit free hanging of the teats, especially when shrinkage of the udder occurs during the milking operation, and after a quantity of milk has been extracted therefrom.

Driving power is communicated to the machine preferably from a shaft 79 which is journalled in opposite end walls of the gear box 16 within which it is provided with a worm 80 which meshes with a worm gear 81, both said worm and gear being preferably carried in an oil bath ensealed in the gear box. The gear 81 is fixed to a rotative vertical arbor 82 which is journalled substantially at its opposite ends in bearings respectively provided for it in the bottom plate 1 and in the plate 10, when those plates are assembled.

The arbor 82 is preferably made between said plates of square cross-section, as illustrated, for the purpose of irrevolubly uniting it to each one of a vertical series of superposed cams 83 that is carried by it.

One cam 83 for each of the finger-supporting frames is provided and when three cams are employed, as shown in the preferred form of embodiment of my machine illustrated, the shape of each cam is preferably that of a quarter sector, as shown in detail in Figure XI.

The preferred operative disposition on the arbor 82 of the said several cams in their several relationships, may be understood from comparison of Figures III, V, and VII.

The several functions of each of said cams is to actuate its appropriate finger-supporting frame, and to that end each of said frames is confined to a definite plane of reciprocation, as by means of guide screw-pins 85 and 86 threaded next to their heads into the end walls 3 and 2, respectively. The inwardly projecting smooth ends of said pins extend through bearing apertures 87 and 88, provided for them in the end rails 27 and 33, respectively, as shown in Figure X, and serve, in the assembled machine, to limit the reciprocatory movement of the finger-supporting frames to the respective planes desired in each instance.

The means provided on each of the finger-supporting frames for operative engagement with their respective cams 83, preferably consists of lugs 90 and 91, which, projecting towards each other from the end rails 27 and 28, respectively, terminate each in a cam-engaging roller 92. The rails 31 and 32 being united to the rail 28, the actuation imparted by the cams 83 through the rollers 92 actuates the entire frame illustrated in Figure X.

Said actuation is communicated to the pair of fingers 35 and 36 and to the pair 37 and 38, with a cushioning or yielding effect in order that the compression of the cow's teats produced by movement of said fingers shall be of a gentle nature. The means employed for that purpose consists preferably of coiled springs 94 and 95 disposed about guide rods 96 and 97, respectively. Two rods 96 and two rods 97 are preferably employed, the rods 96 being each loosely connected at one end as indicated at 98 to a projection 99 on one end of the runner or clip sleeve 57 and 58, respectively, and having its opposite end working in a guide aperture provided for it in the end rail 27, and the other rods 97 being each in like manner connected to its runner or clip sleeve 64 and 65, respectively.

Due to the foregoing arrangement of actuating elements for the milking fingers 49, it will be apparent that these fingers are moved toward their cooperating stationary fingers solely through the action of the cams 83, which cause the frames 27, 28, 29, 30, 31 and 32 to reciprocate, and by the recoil of the springs 94 they are yieldingly pressed in engagement with the teats with sufficient force to extract the milk and yet not with sufficient force to cause discomfort to the cow.

It will also be noted that due to the foregoing arrangement the milking fingers 49 are moved backwards and forwards by the action of the cams 83 upon the reciprocating frames 27 to 32 for a comparatively short distance, just sufficient to allow the milk to flow into the teats, but by pressing back the movable fingers 49 the springs 94 allow these fingers to move back a comparatively long distance, thus making a large space for the insertion of the teats when placing the machine in operative engagement with a cow.

The spring 94 for each rod 96 is interposed between a nut 101 threaded to the rod next to that end thereof which is adjacent to its supporting projection 99, and the end rail 27. The presence of the nuts 101 affords means for properly adjusting the power of the springs 94 as occasion may demand.

In like manner as that just described, the rods 97 are connected with projections 102 on the runners or clip sleeves 64 and 65, respectively. Nuts for the rods 97, corresponding to those provided for the rods 96 are indicated by numerals 103.

Apertures 104 in the end walls 2 and 3, respectively, are provided for protrusion of the rods 96 and 97 through said end walls when occasion therefor is presented by attainment substantially of the limit of separation between the movable fingers illustrated, for example, in Figure I.

The limit of separation just referred to is that employed when the machine is about to be attached to a cow preparatory to milking her or about to be removed from her after milking, and is accomplished by positive means provided for the purpose. Such means consists preferably of mechanism assembled with the cap plate 10 and encased therewith by its side wall 17 and cover plate 21. Its working parts are well shown in Figures I and II, for example, to which reference may now be had.

As shown therein, the wall 17 is narrowed as indicated at 105 to form guideways between them for two flat slide bars 107 and 108 that are susceptible of independent reciprocatory motion one against the other. The said bars are operatively united as by links 109 and 110, each pivoted at its opposite ends as indicated at 111 and 112, to the bottom of a worm gear 114 and to the bars 107 and 108, respectively, so that a partial turn of said gear communicates, through the links, to said bars that degree of reciprocatory movement required of them.

For imparting rotary motion to the gear 114 an intermeshing worm 115 fixed to a shaft 116 mounted in bearings in opposite portions of the side wall 17 may be employed, a crank handle 117, for example, being provided as means for rotating said shaft. The slide bar 107 carries at its end remote from the gear 114, a cross head 118 from opposite ends of which depend through oblong slots 120 in the plate 10 parallel legs 122 which engage the foot pieces 66 on the angle strip arms 61 and 62, respectively, with the operative effect of compelling the runners 64 and 65 to compress their springs 95. At its end adjacent to the gear 114, the bar 107 is deflected laterally as indicated at 123.

In like manner, as shown for example in Figure I, the slide bar 108 is laterally deflected as indicated at 124, so that the two deflecting ends of the two bars 107 and 108 are in effect conjoined to straddle the vertical shaft 126 which, in bearings provided for it in the plate 10 and in the cover plate 21, respectively, carries the gear 114. The bar 108 is provided with a cross-head 127 which is bifurcated for the accommodation to its reciprocal movement of the shaft 126 and the worm 115.

Each end of the cross-head 127 has a depending leg 128 corresponding in function to the legs 122. The legs 128 work in slots 129 provided for them, respectively, in the plate 10, and engage the foot pieces 60 with like effect upon them as that produced upon the foot pieces 66 by their engagement with the legs 122, as has been previously described.

The office of the wing walls 5, 6, 7, and 8, is to afford means of support for the machine in attaching it to a cow for the milking operation. For that purpose said wing wall 5 is paired with the wing wall 7, and the wall 6 with the wall 8.

Each of said pairs of wing walls is preferably united by one of two swinging bails 130 and 131, respectively, and to each bail a suspensory device, preferably a kind of harness is fastened. In this connection it is desirable and practically necessary to provide means of suspension which by conforming to the anatomy of the animal may be used with the best mechanical efficiency without discomfort to the cow. Accordingly, I prefer to provide as a means of suspension a saddle 132 having end trees 133 and 134 to fit comfortably on the back of the cow. The saddle carries on top of it, at a point substantially midway between the trees two pairs of grooved pulleys 136 and 137, which, when in place, are disposed substantially in the same vertical plane with the vertical axis of the cow's udder indicated by the numeral 138 in Figure XII of the drawings.

Over the pair of pulleys 136 a flexible cord 139 passes over and clear of the cow's back. It terminates at its opposite ends in a stirrup having terminal hooks 140 and 141 which engage the bails 130 and 131, respectively, and is preferably provided above each hook stirrup with a tensile spring 143, by which adjustment of the machine to the udder 138 may be gently effected.

Over the pulleys 137 passes a cord 144 by which a pail 145 may be hung underneath the udder and the machine applied thereto.

In practice it will no doubt be found desirable to provide a machine and a harness therefor for each cow, because of the variation in the sizes of cows and in the conformation of their udders and teats. Machines will be made of certain standard sizes such as may be found suitable for groups of cows of certain average sizes and conformations, the object being, of course, to provide the right size of machine for each cow. In a herd nearly uniform in size and conformation it would be feasible to carry one machine from cow to cow and even to use the same harness, this, however, is a detail which will readily solve itself in the face of actual conditions of use in any given instance.

In view of the foregoing specification, the method of operation of my apparatus may be, in brief, described as follows.

Assuming that selection has been made of a machine of proper size to suit the cow to be milked, and that the harness has been properly fitted, the machine is first adjusted to the position of the fingers shown in Figure I. Thereupon the operator, while holding the apparatus with the left hand under and below the udder, with the right hand grasps the loose cord 139 which passes over the pulleys 136 on the saddle, and draws the same down until the hook engages the bail of the machine, opposite or on the further side of the cow. Then with the right hand the operator catches hold of the hook on the near side of the cow and draws the same down with the cord 139 and its spring 143 attached, at the same time pushing the machine upward in such manner that the teats fall naturally and freely into the spaces respectively provided for them between the four pairs of fingers 35—42, when the said hook will engage the bail on the near side of the machine so as to hold it firmly against the udder. After this is done, then in the same manner the operator fastens the cord 144 to the pail so as to suspend the same under the udder of the cow. Next a flexible shaft for example—not shown—having been slipped over the driving shaft 79, the machine is ready for operation. To effect operation of the machine, the handle 117 is rotated in required direction until the movable fingers 35 to 38 are returned to their operative positions and power is applied to the shaft 79.

A salient feature of my invention is derived from the arrangement and peculiar shape of the cams 83. They are so designed and made that the time of one entire revolution of any one cam is in effect divided into four equal parts. One fourth of the time thereof is consumed in causing the appropriate movable finger-supporting frame (Figure X) to move in one direction, say inwardly. One fourth of the time is occupied in holding in a state of rest, said frame and the movable fingers it carries in place at its extreme inward position. One fourth of the time is consumed in reversing the direction of movement of the said movable frame causing it to move outwardly to its extreme outward position. The remaining one fourth of the time is consumed in holding the said movable frame in a state of rest in its extreme outward position or that in which the milk may flow readily into the teat.

To secure best results, the driving shaft is rotated at a high rate of speed—say from 3,000 to 5,000 revolutions to the minute, but the rate of speed is subject to variation up or down.

The result will be not only to reduce the time of milking to a minimum, but also to produce, through the rapid reciprocation of the finger-supporting frame in opposite directions, a continuous gentle vibration of the machine while in close supporting contact with the udder. The effect of such vibration is found to be soothing to the cow, and to promote the flow of milk from the udder into the teats, until the milk supply in the udder is entirely exhausted.

After the milk ceases to flow from the teats, the machine may be removed, although, as was previously specified, no close attention to the time of its removal is necessary because the operation of the machine may continue indefinitely without injurious results of any sort.

What I claim is:

1. In a milking machine, the combination with an assembling member, an intermediate vertical partition thereon, and properly disposed for milking, four stationary compressing members on said partition, two on opposite sides and substantially at opposite ends thereof, respectively, of driving mechanism, four movable compressing members complementary to said stationary members, respectively, means of operative connection between the driving mechanism and the said movable compressing members for actuating them to and from the stationary members, and means independent of the driving mechanism for simultaneously effecting movement of each pair of movable compressing members to the limit of their separation from the stationary compressing members.

2. In a milking machine, the combination with an assembling member, an intermediate vertical partition thereon, and properly disposed for milking, four stationary compressing members on said partition, two on opposite sides and substantially at opposite ends thereof respectively, of driving mechanism, four movable compressing members complementary to said stationary members, respectively, means of operative connection between the driving mechanism and the said movable compressing members for actuating them to and from the stationary members, and means independent of the driving mechanism for effecting movement of each pair of movable compressing members to the limit of their separation from the stationary compressing members, said last named means being operative to temporarily disconnect the movable compressing members from the driving mechanism.

3. In a milking machine, the combination with an assembling member comprising a transverse vertical partition, driving mechanism, comprising a horizontal rotative member, and a vertical arbor in operative communication therewith, of a plurality of finger-supporting frames operatively carried in vertical series on said assembling member, a series of cams fixed to said arbor in cooperative communication with said frames, respectively, in definite successive order of operation substantially as specified, said cams being each substantially in the shape of a quarter sector and the means of said operative communication between them and said frames being adapted to prevent movement of the frames independently of the movement of the cams.

4. In a milking machine, the combination with an assembling member comprising a transverse vertical partition, driving mechanism comprising a horizontal rotative member, and a vertical arbor in operative communication therewith, of a plurality of finger-supporting frames operatively carried in vertical series on said assembling member, a series of cams fixed to said arbor in cooperative communication with said frames, respectively, in definite successive order of operation substantially as specified, said cams being substantially in the shape of a quarter sector, and the means of said operative communication between them and said frames being adapted to prevent movement of the frames independently of the movement of the cams, and compressing members yieldingly secured to said frames, whereby they may receive an independent movement from the movement of the frames.

5. In a milking machine, the combination with an assembling member comprising a transverse vertical partition driving mechanism and a horizontal rotative vertical arbor in operative communication therewith of a plurality of finger-supporting frames operatively carried in vertical series on said assembling member, and a series of cams fixed to said arbor in cooperative communication with said frames, respectively, in definite successive order of operation substantially as specified, said cams being substantially in the shape of a quarter sector and the means of said operative communication between them and said frames being adapted to prevent movement of the frames independently of the movement of the cams, compressing members yieldingly secured to said frames, whereby they may receive an independent movement from the movement of the frames, and means carried by the assembling member for actuating the compressing members against the force of the yielding resistance provided in their means of support upon the finger-supporting frame.

6. In a milking machine, the combination with an assembling member comprising a transverse vertical partition, driving mechanism, and a horizontal rotative vertical arbor in operative communication therewith, of a plurality of finger-supporting frames operatively carried in vertical series on said assembling member, a series of cams fixed to said arbor in cooperative communication with said frames, respectively, in definite successive order of operation substantially as specified, said cams being substantially in the shape of a quarter sector, and the means of said operative communication between them and said frames being adapted to prevent movement of the frames independently of the movement of the cams, compressing members yieldingly secured to said frames, whereby they may receive an independent movement from the movement of the frames, and means carried by the assembling member for actuating the compressing members against the force of the yielding resistance provided in their means of support upon the finger-supporting frame, said actuating means last named comprising engaging members on the said yielding means of support and legs operatively depending in the path of the engaging members from oppositely movable plates carried by a cap plate provided for the assembling member.

7. In a milking machine, the combination with a frame having a plurality of teat chambers, a plurality of movable teat compressing members associated with said chambers for compressing the teats, means for operating the compressing members, and means independent of aforesaid means for simultaneously effecting movement of the movable compressing members to the limit of their separation from the walls of the teat chamber.

8. In a milking machine, the combination with a frame having teat chambers, a plurality of teat compressing members slidably associated with the frame, driving means for reciprocating said movable compressing members, and means independent of said drive means engageable with said movable members for simultaneously moving them to non-compressing positions.

9. In a milking machine, the combination with a frame having a plurality of teat chambers, a plurality of compressing members co-operating with the teat chambers for compressing the teats, said members being provided with sleeves for slidable mounting on said frame, said sleeves being provided with lateral extensions, drive means for moving the compressing members to effect co-operation thereof with the teat chambers, and means independent of said drive means for simultaneous engagement with said lateral extensions for moving said compressing members to non-compressing positions.

In testimony whereof, I have hereunto set my hand.

GEORGE A. BRODIE.